May 12, 1970

H. J. BRETTRAGER 3,511,545

RECIRCULATING BALL BEARING STRUCTURE FOR MOUNTING
A MACHINE TOOL SLIDE

Filed Jan. 24, 1968

INVENTOR.
HENRY J. BRETTRAGER
BY his attorneys,

Learman, Learman & McCulloch

May 12, 1970  H. J. BRETTRAGER  3,511,545
RECIRCULATING BALL BEARING STRUCTURE FOR MOUNTING
A MACHINE TOOL SLIDE
Filed Jan. 24, 1968  2 Sheets-Sheet 2

INVENTOR.
HENRY J. BRETTRAGER
BY *his attorneys,*
*Learman, Learman & McCulloch*

United States Patent Office 3,511,545
Patented May 12, 1970

3,511,545
RECIRCULATING BALL BEARING STRUCTURE
FOR MOUNTING A MACHINE TOOL SLIDE
Henry J. Brettrager, 5410 East St.,
Saginaw, Mich. 48601
Filed Jan. 24, 1968, Ser. No. 700,089
Int. Cl. F16c 17/00, 19/00, 21/00
U.S. Cl. 308—6                                    10 Claims

ABSTRACT OF THE DISCLOSURE

Apparatus for mounting a machine tool slide having spaced apart rod guides on its opposite sides and comprising a linear bearing assembly for each of the upper and lower ends of the slide mount, each assembly having a body provided with an open groove in one side and a parallel bore adjacent the other side for the reception of freely movable balls which engage between the adjacnt slide rod guides, the body having an end cap at each end thereof provided with an arcuate recess establishing communication between the groove and the bore. A rotatable race is interposed between the body and each end member and has a circumferential channel registering with the recess in the associated end member to provide a return passage for the balls, whereby the groove, the return passages and the bore form an endless path through which the balls may circulate. A retaining rod spans the length of and overlies the groove to prevent inadvertent removal of the balls from the groove.

---

The apparatus disclosed herein relates to mounting apparatus for a machine tool slide and more particularly to a linear bearing assembly especially adapted for use in providing an antifriction mounting for the reciprocable slide of a machine tool. The bearing assembly includes freely rotatable balls which are adapted to bear against a guide surface of a slide and circulate in an endless path in response to sliding movement of the slide.

In the design of machine tools of the kind utilizing a reciprocable slide it is desirable to provide rigid lateral stability of the slide between its ways so as to preclude looseness of the slide. At the same time, it is essential that the slide be movable freely along its path of reciprocation. These objectives have been accomplished in the past in many ways, including that of providing bearing balls which circulate in an endless path. In such constructions, however, the ball carrier has been of such size as to provide bearing contact with the slide along substantially the full length of the latter, even though the amount of movement imparted to the slide is relatively small compared to the length of the slide. In such constructions the cost of the ball carrier and the number of balls necessary to provide proper circulation thereof have been excessively high, thereby discouraging the use of such bearing assemblies even though a rotatable ball bearing assembly has many advantages over a bearing construction having relatively sliding surfaces.

Apart from the above mentioned disadvantages of utilizing known circulating ball bearing assemblies, such assemblies in use heretofore have presented problems in retaining the bearings assembled with the slides. That is considerable care and sometimes expensive devices have had to be employed to prevent inadvertent separation of the balls from the ball carrier. Alternatively, the carriers have been so constructed as to prevent inadvertent ball removal and, in so doing, difficulty has been created in effecting loading of the ball carrier with the balls.

An object of this invention is to provide a linear bearing assembly for a reciprocable slide and which overcomes the disadvantages of known constructions for similar purposes.

Another object of the invention is to provide a linear bearing assembly which may be utilized advantageously in the mounting of a reciprocable slide and which avoids the necessity of providing a bearing surface along more than a small part of the slide surface.

A further object of the invention is to provide a linear bearing assembly of the character referred to in which the ball carrier provides a relatively short ball-circulating path, thereby enabling relatively few balls to be utilized in the apparatus.

Another object of the invention is to provide a linear bearing assembly utilizing rotatable balls and in which the loading of balls into the apparatus is extremely simple and yet which includes effective means for preventing inadvertent removal of the balls from the carrier.

Other objects and advantages of the invention will be pointed out specifically or will become apparent from the following description when it is considered in conjunction with the appended claims and the accompanying drawings, in which:

Figure 1:
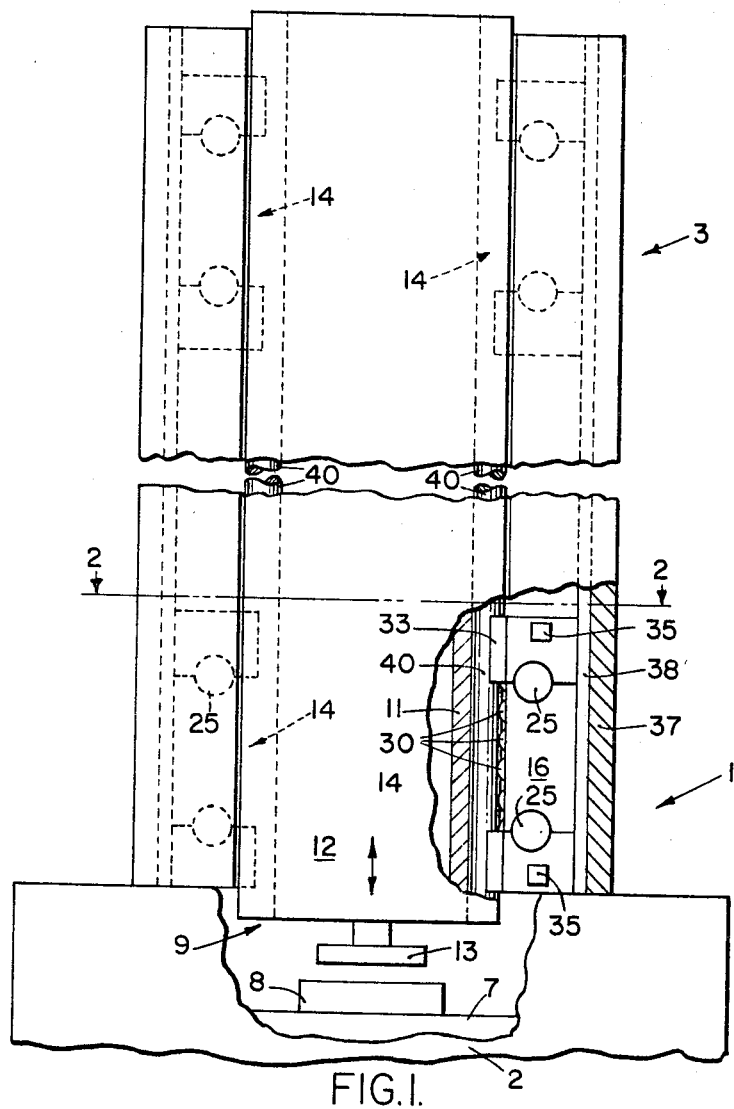
FIG. 1 is a fragmentary view, partly in front elevation and partly in section, of a machine tool having a reciprocable slide mounted in accordance with the invention.

The disclosed apparatus comprises an electrical erosion machine tool generally designated 1 having a base 2 on which is mounted an upright support generally designated 3 having a pair of parallel side members 4 and 5 joined at their rear ends by a cross member 6. Mounted on the base 2 is a table 7 which is recessed so as to permit a quantity of electrolyte fluid to be contained within the base. A workpiece 8 is adapted to be immersed in the electrolyte and supported on the table 7.

Mounted on the support 3 is a vertically reciprocable slide member generally designated 9 having a pair of parallel side walls 10 and 11 joined at their forward ends by a cross member 12. Carried by the slide 9 at the lower end of the latter is an electrode 13 of known construction which is adapted to effect machining of the workpiece 8 by the well-known electro-erosion process.

In the practice of the electro-erosion process, the electrode 13 must be restrained rigidly against movement in a horizontal plane, but it must be capable of adjustment in a vertical plane. Adjustment in a vertical plane must be capable of being controlled within extremely narrow tolerances. It is important, therefore, that the slide be capable of a free and unrestricted vertical movement.

In the disclosed embodiment of the invention the slide is supported by four bearing assemblies of uniform construction and mounted in pairs at the upper and lower ends of the support 3. The bearing assemblies, each of which is generally designated 14, react with guides generally designated 15 provided on opposite sides of the slide 9.

Figure 3:
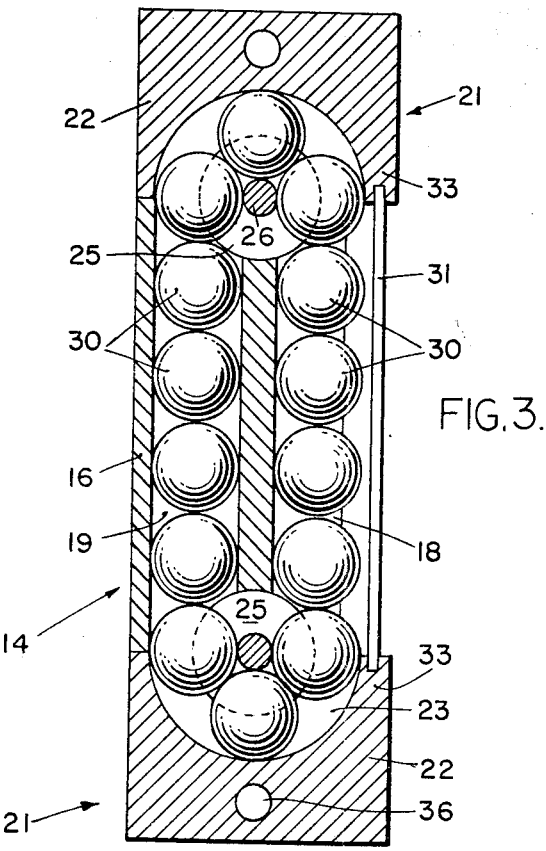
FIG. 3 is a vertical sectional view, on an enlarged scale, illustrating one of the ball carrier assemblies.
Figure 4:
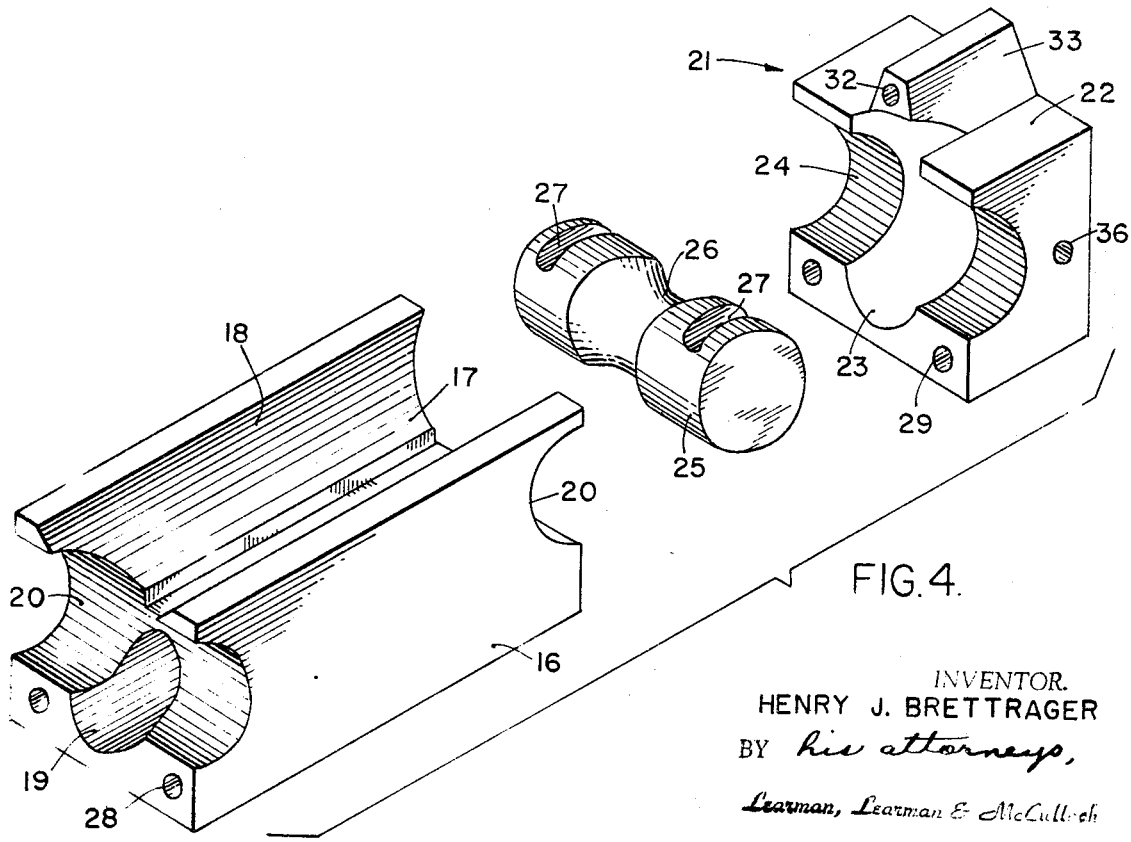
FIG. 4 is an enlarged, exploded, isometric view of parts of the ball carrier assembly.

A bearing assembly 14 is best illustrated in FIGS. 3 and 4 and comprises a generally rectangular body 16 having in one side thereof an outwardly open, longitudinal groove 17 extending the full length of the body 16. The side walls 18 of the groove are arcuate, and converge or taper inwardly of the body. Parallel to the groove 17 and adjacent the opposite side of the body is a longitudinally bored passageway 19 which extends the full length of the body. Each end of the boy is provided with a semicircular groove 20 which extends the full width of the body.

At each end of the body 16 is an end cap or member 21 which comprises a block 22 having an arcuate recess 23 formed therein and which, when the block 22 is fitted to one end of the body 16, establishes communication between the groove 17 and the passageway 19. The block also has a semicircular groove 24 extending transversely of the block and which forms with the associated groove 20 a cylindrical opening.

Interposed between the body 16 and each end member 21 is a substantially cylindrical race 25 which is rotatably accommodated in the opening formed by the grooves 20 and 24 and which has between its ends an annular channel 26. Adjacent each end of each race 25 is an arcuate slot 27 for the reception of a lubricant to promote free rotation of the race.

The end members 21 are assembled with the body 16 by means of screws of dowels (not shown) which are accommodated in openings 28 and 29 provided in the members 16 and 22, respectively. When the end members are assembled with the body the groove 17, the passageway 19, the recess 23 and the channel 26 form an endless path for freely rotatable balls 30. The diameter of each ball 30 is the same and is greater than the depth of the groove 17. Consequently, a ball in the groove 17 will project beyond the side walls 18 of the groove for a purpose presently to be explained. The diameter of the bored passageway 19 corresponds substantially to the diameter of the balls 30 with sufficient clearance to permit free passage of the balls through the passageway. The combined depths of the recess 23 and the channel 26 correspond substantially to the diameter of the balls 30 so as to permit free circulation of the balls from the passageway 19 to the groove 17.

The number of balls contained in each bearing assembly 14 should be such as to fill completely the endless path with sufficient clearance between the balls to enable them to roll about their own axes without any substantial restriction.

As has been stated previously the groove 17 tapers inwardly of the body 16. Consequently, it is a simple matter to fill the endless path of the bearing assembly 14 with the balls 30 merely by placing the balls in the groove 17 and pushing them around the path until the path is completely filled with balls. When the path is filled with balls, those balls in the recesses 23 and in the channels 26 will act to maintain the races 25 assembled with the body 16 and the respective end members.

Means is provided for retaining the balls in the bearing assembly and comprises an elongated rod 31 which spans the full length of the groove 17 and overlies the latter. The ends of the rod 31 are accommodated in openings 32 provided in tongues 33 carried by the respective blocks 22, the tongues tapering in a direction away from the associated blocks. The retaining rod 31 is positioned parallel to the longitudinal center line of the groove 17 and sufficiently closely to the balls 30 as to prevent their passing between the rod 31 and either side wall 18 of the groove 17.

Figure 2:
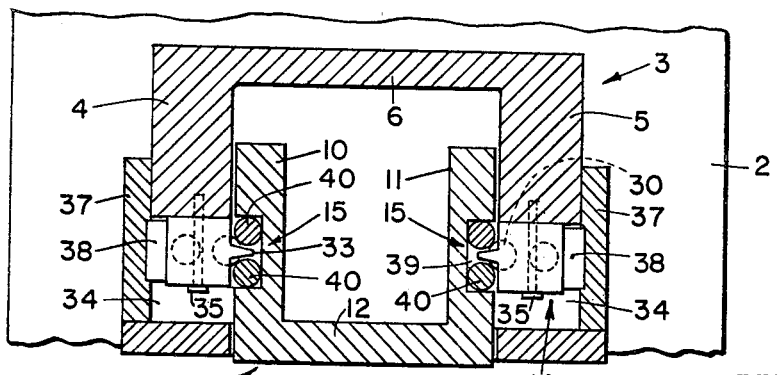
FIG. 2 is a transverse sectional view taken on the line 2—2 of FIG. 1.

As is best illustrated in FIGS. 1 and 2, the side walls 4 and 5 of the support 3 are provided with slots 34 in which the bearing assemblies 14 are accommodated. The bearing assemblies 14 are secured to the respective support walls 4 and 5 by bolts 35. A backing plate is secured to each side wall 4 and 5 in overlying relation to the slots 34 and between each backing plate and the associated bearing plate assembly is a shim 38 by means of which the bearing assemblies may be adjusted toward and away from one another.

The side walls 10 and 11 of the slide 9 are provided with recesses 39 which confront the respective slots 34 and in which the guide means 15 is mounted. The guide means 15 comprises a pair of parallel, spaced apart, cylindrical rods 40 fixed in each recess 39 and extending the full length of the slide 9. The spacing between the rods 40 of each pair is sufficient to accommodate therebetween the tongues 33 on the end members of the respective bearing assemblies 14. The arrangement is such that the balls 30 in the grooves 17 bear against both rods 40 of the associated guide means 15 so as to preclude movement of the slide 9 in a horizontal plane but to permit free vertical reciprocation of the slide 9.

As is indicated in FIG. 2, each of the guide rods 40 bears against two right angular walls of a recess 39 and the balls 30 bear against both rods 40 of each pair. As a consequence, the bearing balls 30 roll along a groove formed by the space between the two rods 40. Any wear occurring to the rods 40 may be compensated for by adjustment of the bearing assembly 14 toward the adjacent pair of rods 40.

In machines of the general class referred to, the extent of movement of the slide 9 from one extreme position to the other is not large. Accordingly, it has been found that the provision of bearing assemblies adjacent the upper and lower ends of the slide provide ample support for the slide, so long as the length of the slide is somewhat more than that required to span the distance between the top and bottom bearing assemblies.

Although no means has been disclosed herein for effecting reciprocation of the slide 9, it will be understood that any suitable and conventional mechanism may be employed for this purpose.

The disclosed embodiment is representative of the presently preferred form of the invention, but the disclosure is intended to be illustrative rather than definitive thereof. The invention is defined in the claims.

What is claimed is:

1. A linear bearing assembly comprising: a body member having a groove in one side thereof and a passageway at the other side thereof; an end member at each end of said body, each of said end members having a recess therein; a race member interposed between each of said end members and said body member and having a channel therein in register with the recess in the associated end member, said recess and said channel together forming an arcuate passage establishing communication between said passageway and said groove; and antifriction bearing means occupying said groove, said passageway and said passage for circulation in an endless path, said bearing means constituting means maintaining the channel in each of said race members in register with its associated recess.

2. The construction set forth in claim 1 wherein said groove has a depth such that the bearing means occupying said groove project beyond said one side of said body member.

3. The construction set forth in claim 2 wherein said groove tapers inwardly from said one side of said body member.

4. The construction set forth in claim 1 including means connecting said end members and overlying said groove in a position to preclude removal of said bearing means from said groove.

5. The construction set forth in claim 1 wherein each of said race members comprises a cylinder having said channel located between its ends.

6. The construction set forth in claim 5 wherein each of said race members is rotatable and wherein the channel in each of said race members is endless.

7. The construction set forth in claim 1 wherein said bearing means comprises a plurality of balls of substantially uniform diameter.

8. The construction set forth in claim 7 wherein said groove has a depth less than the diameter of said balls.

9. The construction set forth in claim 7 wherein said passageway comprises a bore having a diameter corresponding substantially to the diameter of said balls.

10. The construction set forth in claim 7 wherein the passage formed by said recess and said channel has a diameter corresponding substantially to that of said balls.

(References on following page)

References Cited

UNITED STATES PATENTS

| | | | |
|---|---|---|---|
| 732,490 | 6/1903 | York | 308—185 |
| 3,272,569 | 9/1966 | Mergen. | |
| 3,357,753 | 9/1966 | Ionov. | |
| 2,299,677 | 10/1942 | Bickel. | |
| 2,599,969 | 6/1952 | Bajulaz. | |
| 2,929,661 | 3/1960 | Brown. | |
| 2,973,671 | 3/1961 | Elkins. | |
| 3,044,835 | 7/1962 | Hurd. | |
| 3,071,418 | 1/1963 | Hayes. | |
| 3,194,612 | 7/1965 | Striepe. | |
| 3,245,731 | 4/1966 | Erikson. | |
| 3,304,133 | 2/1967 | Strassberg. | |
| 3,398,999 | 8/1968 | Halvorsen. | |

FOREIGN PATENTS

| | | |
|---|---|---|
| 434,934 | 5/1948 | Italy. |

MARTIN P. SCHWADRON, Primary Examiner

L. L. JOHNSON, Assistant Examiner